United States Patent Office 2,763,673
Patented Sept. 18, 1956

2,763,673

PROCESS FOR MAKING TETRAETHYL LEAD

Thomas W. Gittins, Ridley Park, Pa., and Edwin L. Mattison, Newark, Del., assignors to E. I. du Pont de Nemours & Company, Wilmington, Del., a corporation of Delaware No Drawing. Application May 4, 1953,
Serial No. 352,984

11 Claims. (Cl. 260—437)

This invention relates to a process for making tetraethyl lead and more particularly for converting hexaethyl dilead, alone or in tetraethyl lead, to tetraethyl lead.

Tetraethyl lead has been made commercially for many years by a batch process which briefly comprises introducing lead-monosodium alloy and ethyl chloride into an autoclave equipped with plow-type agitators, heating the mixture with agitation under pressure at temperatures of from about 65° C. to about 85° C. until the reaction is complete, usually for 5 or more hours, then releasing the pressure and distilling off excess ethyl chloride, then discharging the reaction mixture of tetraethyl lead, metallic lead, sodium chloride and some unreacted alloy into a still containing a large volume of water, and then subjecting the mixture to steam distillation to distill the tetraethyl lead from the reaction mixture. A little less than 25% of the lead in the alloy is converted to tetraethyl lead, nearly all of the rest being converted to metallic lead. The solids from the still are treated by known methods to recover the lead therefrom.

In the course of such reaction, some hexaethyl dilead (hexaethyl diplumbane $(C_2H_5)_3Pb—Pb(C_2H_5)_3$), is formed. However, the recovered tetraethyl lead does not contain any significant amounts of hexaethyl dilead. This is because the long period of heating, the distillation of the excess ethyl chloride and the steam distillation constitute conditions which favor the conversion of the hexaethyl dilead to other products, particularly in the presence of the solid reaction products. Under such conditions, a portion of the hexaethyl dilead is converted to tetraethyl lead and metallic lead and a considerable portion is decomposed to gaseous products or converted to other insoluble products which are substantially valueless and which represent material losses in the yield of tetraethyl lead. It is highly desirable to provide a method for eliminating such losses by converting much larger proportions of such hexaethyl dilead to tetraethyl lead.

Recently, methods of making tetraethyl lead have been discovered wherein the reaction between the ethyl chloride and lead alloy is caused to take place at a much more rapid rate so that the reaction is completed in from about 5 to about 30 minutes, and wherein other conditions favoring the conversion and the decomposition of hexaethyl dilead, are eliminated. This is particularly true of the continuous processes. The tetraethyl lead, obtained by such methods even in the presence of large excesses of ethyl chloride, usually contains from about 3% to about 7% by weight of hexaethyl dilead and may contain as little as 0.2% or as much as 15%.

Hexaethyl dilead is an undesirable impurity in tetraethyl lead and, when present in a concentration of as much as 0.3%, is highly objectionable. It is much less volatile and more unstable than tetraethyl lead. When tetraethyl lead, containing 0.3% or more of hexaethyl dilead, is used in a motor fuel, the hexaethyl dilead will accumulate in carburetors, manifolds and similar parts of the engines and, during storage of the motor fuel, will decompose to produce troublesome precipitates. Less than 0.3% of hexaethyl dilead can usually be tolerated in the tetraethyl lead, as such amounts do not cause trouble in storage or in use in motor fuels.

It is well known that hexaethyl dilead can be partially converted to tetraethyl lead and metallic lead by heat according to the following equation:

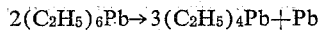

$$2(C_2H_5)_6Pb \rightarrow 3(C_2H_5)_4Pb + Pb$$

However, such reaction is accompanied by a considerable amount of decomposition of the hexaethyl dilead to gaseous products and insoluble lead compounds, particularly at temperatures of about 80° C. and above, whereby the yields of tetraethyl lead are undesirably low. It has been proposed to carry out such conversion in the presence of certain catalysts, such as silica gels and certain silicates. While such catalysts give rapid initial rates of conversion of hexaethyl dilead to tetraethyl lead, the last part of the reaction is slow. More important, the lead and insoluble lead compounds formed in the reaction are mixed with silicon compounds which make it difficult and costly to recover pure lead therefrom suitable for use in making lead-sodium alloy. This results in a serious loss of lead or increase in cost of the process because at least 25% of the lead, in the hexaethyl dilead, is produced in such form.

It is an object of the present invention to provide a new and improved process for converting hexaethyl dilead to tetraethyl lead. Another object is to provide such a process wherein the lead, produced as a by-product, is obtained in a form which can be readily recovered and purified in an economical manner. A particular object is to provide a new and improved method for treating tetraethyl lead which contains hexaethyl dilead to materially decrease the amount of hexaethyl dilead therein. Further objects are to provide a novel process and to advance the art. Still other objects will appear hereinafter.

The above and other objects may be accomplished in accordance with our invention which comprises heating hexaethyl dilead with activated carbon at a temperature of from about 40° C. to about 110° C.

We have found that activated carbon is a very effective catalyst for the conversion of hexaethyl dilead to tetraethyl lead in high yields at such temperatures. Such carbon separates from the reaction mass with the lead and the insoluble lead compounds and does not interfere with the recovery of the lead therefrom. The carbon may be readily burned off or, if the lead is recovered by regular metallurgical processes, the carbon may be used as a reducing agent therein to reduce lead oxide present in the mixture or to prevent oxidation of the lead during such processes. Thus, it is apparent that the activated carbon has definite advantages over the silicon compounds previously proposed as catalysts for such reaction.

Activated carbons are commonly made by heating organic matter to a moderately high temperature, either in the absence of air or in the presence of a limited amount of air, until the organic matter is converted to carbon, and then activating such carbon by heating it with air, steam, carbon dioxide and the like. The term "activated carbon" is used herein to mean carbons so made, including those made directly from animal or vegetable materials, such as wood, nut shells and bones while retaining their original structures, as well as those made from unorganized organic substances, such as sugar and extracted lignin. Commercial activated carbons, made for decolorizing solutions and for adsorbing gases, are particularly suitable for use in our invention.

The activated carbon may vary in form from very finely-divided particles to large blocks or chunks. However, it will usually be desirable to have the activated carbon in the form of moderately coarse particles, small pieces, granules or compressed porous pellets which can be readily separated from the liquid by simple procedures such as filtration and decantation while providing large surface areas for efficient contact with the liquid.

The process may be used to treat pure or substantially pure hexaethyl dilead or mixtures containing it. Preferably, it is applied to tetraethyl lead containing from 0.2% to about 15% by weight of hexaethyl dilead, such as is obtained in processes for making tetraethyl lead and working up the product, particularly such as is produced by continuous processes. The activated carbon may be added to the reaction vessel with the ethyl chloride or lead-sodium alloy or other reactants employed for making tetraethyl lead, whereby it will convert the hexaethyl dilead as it is formed. Desirably, the activated carbon is added so as to be present when crude tetraethyl lead is being subjected to various purifying procedures at elevated temperatures, such as steam distillation or blowing with air to remove traces of bismuth compounds and other impurities as in Patent No. 2,400,383 of Bertolette et al. Such methods can be readily carried out as continuous operations, e. g., isolated crude tetraethyl lead, containing hexaethyl dilead, may be continuously passed through a heated bed or column of the activated carbon, preferably in the form of porous granules or porous compressed pellets. Most preferably, the process will be applied to tetraethyl lead containing from about 0.3% to about 6% by weight of hexaethyl dilead to decrease the concentration of the hexaethyl dilead to that which can be tolerated.

Large proportions of hexaethyl dilead in tetraethyl lead are readily determined by determining the density of the mixtures and comparing with a chart in which densities of known mixtures are plotted against their composition. When the amount of hexaethyl dilead is small, a measured amount of tetraethyl lead is distilled from the mixture and the hexaethyl dilead determined as above. These methods may be supplemented by the well known method for determining tetraethyl lead by titration with iodine, bearing in mind that hexaethyl dilead also reacts quantitatively with the iodine but that a different amount of iodine is required.

The amount of the activated carbon employed can be varied from 0.2% to about 10% by weight of the material treated (pure hexaethyl dilead or solution of hexaethyl dilead in tetraethyl lead), preferably in a proportion of from about 1% to about 10% by weight.

While the temperatures may vary from about 40° C. to about 110° C., it is preferred to use temperatures of from about 50° C. to about 90° C., particularly when the process is employed with high concentrations of hexaethyl dilead. There is serious danger of decomposition of the hexaethyl dilead with explosive violence at temperatures of about 100° C. and above unless it is diluted to a concentration of 15% by weight or less with tetraethyl lead or another solvent.

The time of treatment varies with the temperature, with the amount and activity of the activated carbon, and with the completeness of conversion desired, the rate of conversion increasing with increase in the temperature and in the amount and activity of the carbon. Complete conversion of the hexaethyl dilead in tetraethyl lead usually is not necessary, but it is ordinarily sufficient to decrease the concentration of the hexaethyl dilead to less than 0.3% by weight.

In order to more clearly illustrate our invention, preferred modes of carrying the same into effect and the advantageous results to be obtained thereby, the following examples are given:

EXAMPLE 1

*Conversion of pure hexaethyl dilead to tetraethyl lead*

Two grams (3.64 weight per cent) of an activated wood charcoal was added to 55 grams of pure hexaethyl dilead (Sp. gr. 1.9 measured at 25° C.) heated to 50° C. The mixture was agitated at 50° C. for four and one-half hours. At the end of this time, the mixture was filtered to remove carbon and lead sludge. The specific gravity of the filtrate was 1.735, which is equal to the density of a known mixture of 64% tetraethyl lead and 36% hexaethyl dilead. Thus, 64% of the hexaethyl dilead was converted into tetraethyl lead. When a similar charge was heated for 24 hours, practically all the hexaethyl dilead was converted to tetraethyl lead.

EXAMPLE 2

*Conversion of the hexaethyl dilead in tetraethyl lead to tetraethyl lead*

One gram of decolorizing carbon, made by carbonizing lignin extracted from wood pulp, was added to 50 grams of a sample of tetraethyl lead containing 97.0% tetraethyl lead and 3.0% hexaethyl dilead. The mixture was agitated at 70° C. for one hour. At the end of the heating time, the composition had changed to 98.7% tetraethyl lead and 1.3% hexaethyl dilead. In a similar experiment employing 5 grams of the same carbon and heating at 80° C. for one hour, the final product contained 99.2% tetraethyl lead.

EXAMPLE 3

*Continuous treatment*

164 grams of tetraethyl lead, containing 93.6% tetraethyl lead and 6.4% hexaethyl dilead, was passed down through a jacketed column (1 by 20 centimeters) packed with activated carbon of the kind used in Example 2. Steam at slightly above atmospheric pressure was passed through the jacket of the column to heat the carbon. The weight of carbon in the column corresponded to 5–10% of the weight of tetraethyl lead treated. The tetraethyl lead mixture was passed down through the column at the rate of 2 cc. per minute, the temperature of the mixture being between 85° C. and 95° C.

The product from the bottom of the column contained 99.5% tetraethyl lead showing almost complete conversion of hexaethyl dilead to tetraethyl lead. The treated tetraethyl lead was clear and stable to storage in the presence of the usual blending and scavenging agents, thus demonstrating that less than 0.3% hexaethyl dilead was present in the treated product.

Similar results were obtained with tetraethyl lead containing only 0.2% of hexaethyl dilead.

EXAMPLE 4

*Treatment during steam distillation*

79.5 grams of tetraethyl lead, containing approximately 5% of hexaethyl dilead was heated with about 800 grams of water, with gentle reflux for 1 hour at 100° C. in the presence of 1% of the same kind of activated carbon used in Example 2. Thereafter, the mixture was steam distilled, giving a colorless white non-aqueous phase with a purity, as tetraethyl lead, of 98.8%, and suitable for use in gasoline. The recovery was 98.9%.

A similar run, except that there was used another grade of decolorizing carbon of the type used in Example 2, gave a distillate of 98.7% purity as tetraethyl lead and a recovery of 93.7%.

On the other hand, when hexaethyl dilead itself was subjected to steam distillation in the absence of carbon, it was only very slowly and incompletely converted to tetraethyl lead with a 75% loss of the initial organic lead compounds.

EXAMPLE 5

*Aeration of tetraethyl lead containing hexaethyl dilead*

50 grams of yellowish tetraethyl lead, containing approximately 4% hexaethyl dilead, was heated to 70° C. in a flask. Then 1 gram of activated carbon, of the kind used in Example 2, was added and the liquid was covered with 5 cc. of water. The mixture was aerated at 70° C. for one hour, using a current of air sufficient to give good agitation, and was then cooled, filtered, and the water separated. The treated tetraethyl lead was a clear colorless oil having a purity of 98.5%.

It will be understood that the preceding examples are given for illustrative purposes solely and that our invention is not limited to the specific embodiments described therein. On the other hand, it will be apparent to those skilled in the art that many variations and modifications can be made therein, particularly in the activated carbon, the proportions thereof, the temperatures and the techniques employed, within the scope of the general disclosure without departing from the spirit or scope of our invention.

From the preceding description, it will be apparent that we have provided a novel and improved method for converting hexaethyl dilead to tetraethyl lead. The activated carbon is a very efficient catalyst for the reaction and results in high conversions of hexaethyl dilead and high yields of tetraethyl lead. At the same time, the activated carbon has important advantages over the catalysts previously proposed for the reaction in that it does not introduce an objectionable impurity into the lead (obtained as a by-product of the reaction) but is sometimes desirable in the lead, whereby the lead can be readily and cheaply recovered from the reaction mass, resulting in important economies in the process. Therefore, it is apparent that our invention constitutes a valuable advance in and contribution to the art.

What is claimed is:

1. The process for converting hexaethyl dilead to tetraethyl lead which comprises heating hexaethyl dilead with from 0.2% to about 10% by weight of activated carbon at a temperature of from about 40° C. to about 110° C.

2. The process for converting hexaethyl dilead to tetraethyl lead which comprises heating a member of the group consisting of substantially pure hexaethyl dilead and tetraethyl lead containing from 0.2% to about 15% by weight of hexaethyl dilead at a temperature of from about 40° C. to about 110° C. with from 0.2% to about 10% by weight of activated carbon, and separating the liquid from the reaction mixture.

3. The process for converting hexaethyl dilead to tetraethyl lead which comprises heating a member of the group consisting of substantially pure hexaethyl dilead and tetraethyl lead containing from 0.2% to about 15% by weight of hexaethyl dilead at a temperature of from about 50° C. to about 90° C. with from about 1% to about 10% by weight of activated carbon, and separating the liquid from the reaction mixture.

4. The process which comprises heating tetraethyl lead containing from 0.2% to about 15% by weight of hexaethyl dilead at a temperature of from about 40° C. to about 110° C. with from 0.2% to about 10% by weight of activated carbon, and separating the liquid from the reaction mixture.

5. The process which comprises heating tetraethyl lead containing from about 3% to about 15% by weight of hexaethyl dilead at a temperature of from about 40° C. to about 110° C. with from 0.2% to about 10% by weight of activated carbon, and separating the liquid from the reaction mixture.

6. The process which comprises heating tetraethyl lead containing from about 3% to about 15% by weight of hexaethyl dilead at a temperature of from about 50° C. to about 90° C. with from about 1% to about 10% by weight of activated carbon, and separating the liquid from the reaction mixture.

7. The process which comprises flowing tetraethyl lead containing from 0.2% to about 15% by weight of hexaethyl dilead through a bed of activated carbon at a temperature of from about 40° C. to about 110° C., and recovering tetraethyl lead in which the amount of hexaethyl dilead has been materially decreased.

8. The process which comprises flowing tetraethyl lead containing from about 3% to about 15% by weight of hexaethyl dilead through a bed of activated carbon at a temperature of from about 85° C. to about 95° C., and recovering tetraethyl lead in which the amount of hexaethyl dilead has been materially decreased.

9. The process which comprises mixing tetraethyl lead containing from 0.2% to about 15% by weight of hexaethyl dilead with from 0.2% to about 10% by weight of activated carbon, and steam distilling such mixture.

10. The process which comprises mixing tetraethyl lead containing from about 3% to about 15% by weight of hexaethyl dilead with from about 1% to about 10% by weight of activated carbon, and steam distilling such mixture.

11. The process which comprises mixing tetraethyl lead containing from 0.2% to about 15% by weight of hexaethyl dilead with from 0.2% to about 10% by weight of activated carbon, heating such mixture at a temperature of from about 40° C. to about 110° C., and blowing air through such heated mixture.

References Cited in the file of this patent

UNITED STATES PATENTS

| 2,407,261 | Downing et al. | Sept. 10, 1946 |
| 2,571,987 | McDyer et al. | Oct. 16, 1951 |

OTHER REFERENCES

Calingaert: Chem. Rev., vol. 2 (1925–6), page 68.